United States Patent [19]

Hasegawa

[11] Patent Number: 5,203,216
[45] Date of Patent: Apr. 20, 1993

[54] SUPPORTING APPARATUS FOR SUPPORTING PINION SHAFT IN RACK-PINION POWER TRANSMITTING SYSTEM

[75] Inventor: Kiyoshi Hasegawa, Fujisawa, Japan

[73] Assignee: Nippon Seiko Kabushiki Kaisha, Tokyo, Japan

[21] Appl. No.: 666,087

[22] Filed: Mar. 7, 1991

[30] Foreign Application Priority Data

Mar. 28, 1990 [JP] Japan .................. 2-30940[U]

[51] Int. Cl.⁵ .................. B62D 3/12; F16H 19/04
[52] U.S. Cl. .................. 74/498; 74/422
[58] Field of Search .......... 74/89.17, 422, 498; 384/504

[56] References Cited

U.S. PATENT DOCUMENTS

| | | | |
|---|---|---|---|
| 1,439,901 | 12/1922 | Knowles | 384/504 X |
| 3,447,394 | 6/1969 | Wagner et al. | 74/424.8 |
| 3,688,374 | 9/1972 | Goldsmith | 74/498 X |
| 3,986,754 | 10/1976 | Torrant | 384/504 |
| 4,425,009 | 1/1984 | Fillon et al. | 384/504 X |
| 4,815,329 | 3/1989 | Ansgar et al. | 74/422 |
| 4,841,799 | 6/1989 | Entzminger | 74/89.17 X |
| 4,841,844 | 6/1989 | Tootle | 74/89.17 X |
| 4,939,947 | 7/1990 | Toyoshima et al. | 74/498 X |

FOREIGN PATENT DOCUMENTS

| | | | |
|---|---|---|---|
| 1195183 | 6/1965 | Fed. Rep. of Germany | 74/498 |
| 2748011 | 5/1978 | Fed. Rep. of Germany | 74/422 |
| 47-7016 | 4/1972 | Japan . | |

Primary Examiner—Allan D. Herrmann
Attorney, Agent, or Firm—Shapiro and Shapiro

[57] ABSTRACT

A rack-pinion steering mechanism for a vehicle, comprises a housing, a pinion shaft having housed within the housing a pinion and first and second supporting portions respectively disposed to opposite sides of the pinion, and a rack shaft having a rack meshed with the pinion within the housing, the rack shaft being shiftable in an axial direction thereof by rotation of the pinion to shift a tie rod axially. The second supporting portion of the pinion shaft is supported within the housing by a corresponding bearing, and the first supporting portion is supported within the housing by a pair of angular rolling bearings having respective inner races fixed to the first supporting portion and respective outer races abutted with one another. The outer races are held with a predetermined pre-load in abutment between a stepped portion of the housing and a nut threaded to the housing and pressing against the outer races but not pressing against the inner races.

4 Claims, 3 Drawing Sheets

SUPPORTING APPARATUS FOR SUPPORTING PINION SHAFT IN RACK-PINION POWER TRANSMITTING SYSTEM

BACKGROUND OF THE INVENTION

1. Field of the Invention

The present invention relates to a supporting apparatus for supporting a pinion shaft in a rack-pinion power transmitting system. Such supporting apparatus is disposed between a steering wheel shaft and an input shaft of a steering gear which are not arranged on the same straight line (i.e., arranged in an inclined or helix relation) and serves to support a pinion shaft of the steering gear which transmits the rotational force received from the steering wheel shaft to a pinion gear.

2. Related Background Art

In the past, a steering system of a motor vehicle has been designed as shown in FIG. 3.

An end of a steering wheel shaft 102 rotated around its own axis by manipulating a steering wheel 100, and an input shaft 108 of a steering gear 106 for shifting a tie-rod 104 a an axial direction are interconnected via a connecting shaft 110. The ends of the connecting shaft 110 are respectively connected to one end of the steering wheel shaft 102 and to one end of the input shaft 108 via universal joints 112, 114 such as cross joints. Thus, the rotational force from the steering wheel shaft 102 is transmitted to the input shaft 108 of the steering gear 106 through one of the joints 112, connecting shaft 110 and the other of the joints 114.

The details of the steering gear are shown in FIG. 4. The steering gear 106 comprises a rack shaft 122 having a rack 121 and axially slidably (in a direction perpendicular to the plane of FIG. 4) inserted into a housing 120, a pinion shaft 124 rotatably inserted into the housing 120, a pinion 136 fixedly mounted on an intermediate portion of the pinion shaft 124 and meshed with the rack 121, and a pair of ball bearings 126 disposed between an inner surface of the housing 120 and an outer surface of the pinion shaft 124 on both sides of the pinion 136 to support supporting portions 125, 127.

Both ends of the rack shaft 122 and one end (right end in FIG. 4) of the pinion shaft 124 which is not meshed with the rack 121 are protruded from the housing 120, respectively, so that, by rotating the protruded end of the pinion shaft 124 (corresponding to the aforementioned input shaft 108), the protruded ends of the rack shaft 122 can be displaced in the axial direction. In this way, the rotational movement is converted into linear movement.

In such a construction as just described, the rigidity of the pinion shaft 124 to the load acting in the axial direction (left-and-right direction in FIG. 4) greatly influences the response characteristic of the power transmission between the pinion shaft 124 and the rack shaft 122. Thus, in the past, ball bearings of angular type or tapered roller bearings have been used as the pair of bearings 126, and the both bearings 126 were appropriately pre-loaded in assembling the pinion shaft 124 into the housing 120. However, this solution makes the assembling of the pinion shaft 124 into the housing 120 difficult and also makes the rack-pinion power transmitting system such as the steering gear 106 expensive.

In order to improve the assemblage of the pinion shaft 124 into the housing 120, conventionally, as shown in FIG. 5, it has been known to support the pinion shaft 124 at its inner end by a roller bearing such as a needle bearing 128 and at its intermediate portion by a deep groove ball bearing 130. However, with this arrangement, the rigidity of the pinion shaft 124 to the load acting in the axial direction is weaker than that of the arrangement of FIG. 4, thus not always providing a sufficient response characteristic of the power transmission between the pinion shaft 124 and the rack shaft 122.

SUMMARY OF THE INVENTION

An object of the present invention is to provide a supporting apparatus for supporting a pinion shaft in a rack-pinion power transmitting system which can eliminate the above-mentioned conventional drawbacks and which, more particularly, provides strong axial rigidity and permits easy assembling of the pinion shaft into a housing.

In order to achieve the above object, the present invention provides a supporting apparatus for supporting a pinion shaft in a rack-pinion power transmitting system for a motor vehicle, which system includes a pinion shaft rotated by a steering wheel shaft and a rack shaft axially shifted by the rotation of the pinion shaft to shift a tie rod in an axial direction, the pinion shaft and rack shaft being housed in a housing. According to the invention, first and second supporting portions of the pinion shaft are situated on both sides of the pinion and disposed within the housing, the second supporting portion is supported by a second bearing means attached to the housing and the first portion is supported by a first bearing means comprising a pair of pre-loaded bearings attached to the housing. The rack shaft is inserted into the housing in a direction perpendicular to the pinion shaft in such a manner that a rack portion formed on a part of the rack shaft is meshed with the pinion.

According to the pinion shaft supporting apparatus of the invention, it is possible to provide a rack-pinion power transmitting system having the pinion shaft with strong rigidity to the axial load and good power transmission response between the pinion shaft and the rack shaft.

DESCRIPTION OF THE PREFERRED EMBODIMENTS

The present invention will now be fully explained in connection with embodiments thereof with reference to the accompanying drawings.

Figure 1:
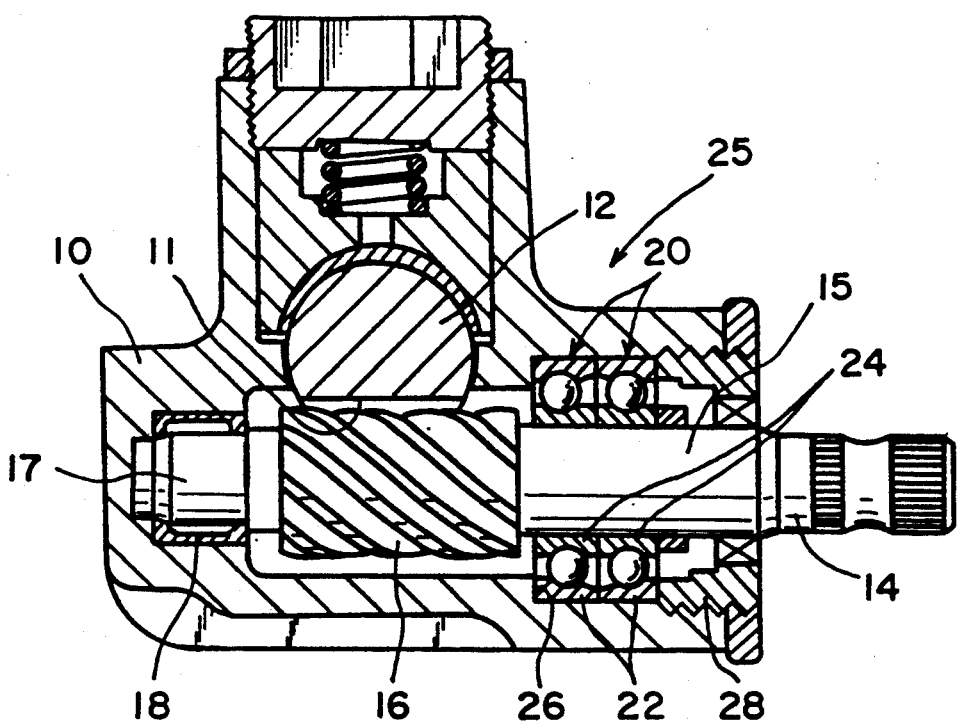
FIG. 1 is a sectional view of a rack-pinion power transmitting system incorporating a pinion shaft supporting apparatus according to a preferred embodiment of the present invention.
Figure 3:
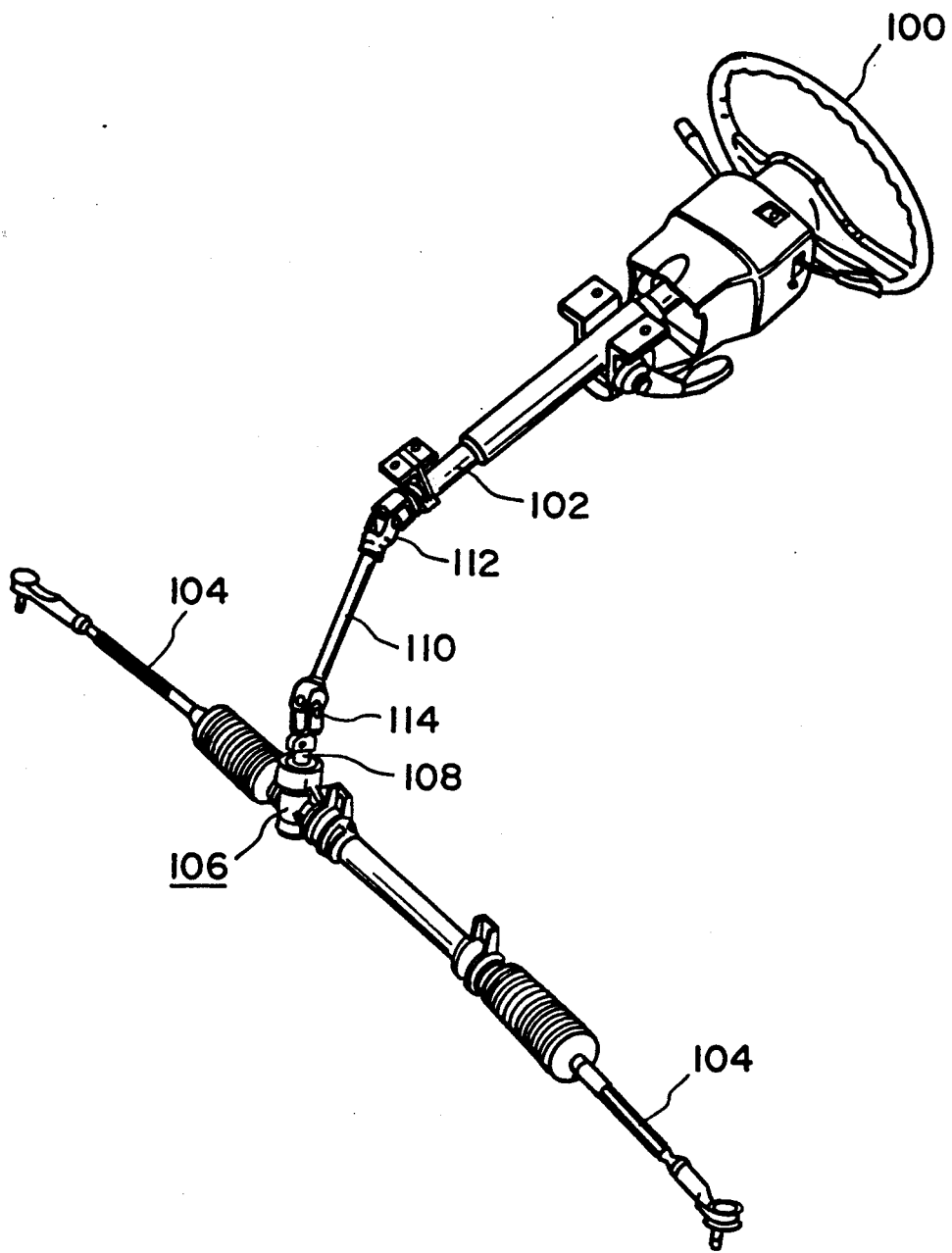
FIG. 3 is a perspective view showing an example of a steering mechanism.
Figure 4:
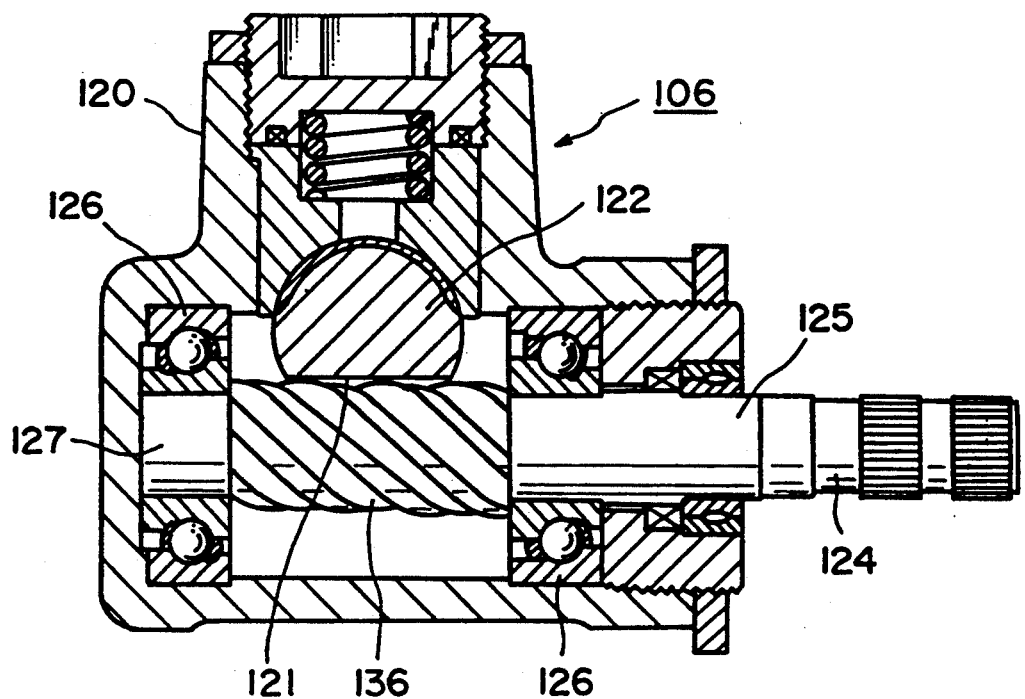
FIGS. 4 and 5 are sectional views showing first and second conventional examples, respectively.
Figure 5:
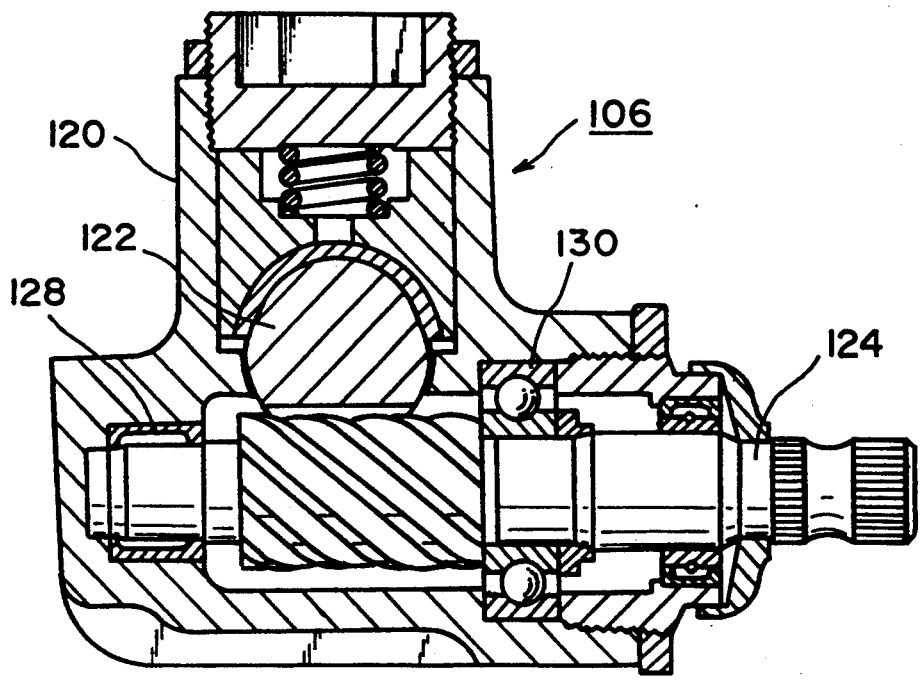

FIG. 1 shows a first embodiment of the present invention which may be incorporated in a system having the same general construction as that shown in FIG. 3.

A rack shaft 12 having a rack 11 is inserted into a housing 10 in such a manner that the rack shaft can be shifted only in an axial direction (direction perpendicular to the plane of FIG. 1). Further, a portion of a pinion shaft 14 disposed transversely (i.e., perpendicular to) the rack shaft 12 is also inserted into the housing 10 in such a manner that the pinion shaft can be rotated around its own axis but not be axially shifted.

A pinion 16 is integrally formed on an intermediate portion of the pinion shaft 14, which pinion is meshed with the rack 11 so as to permit the power transmission between the pinion shaft 14 and the rack shaft 12.

Bearings are disposed between outer surfaces of first and second supporting portions 15, 17 (positioned on both sides of the pinion 16) of the pinion shaft 14 and an inner surface of the housing 10, thus permitting the rotation of the pinion shaft 14 within the housing 10. More particularly, the second supporting portion 17 positioned at a free end (left end in FIG. 1) of the pinion shaft 14 on one side (left side) of the pinion 16 is supported by the housing 10 via a first bearing means comprising a roller bearing 18, as in the conventional technique. On the other hand, the first supporting portion 15 positioned at an intermediate portion of the pinion shaft 14 on the other side (right side in FIG. 1) of the pinion 16 is supported by a second bearing means 25 comprising two ball bearings 20 of angular type. The ball bearings 20 are abutted against each other in a so-called face combination fashion wherein side surfaces of the bearings including larger diameter portions of outer races 22 thereof are face-to-face contacted with each other. The two ball bearings 20 of angular type are pre-loaded to a degree which is predetermined by their arrangement in the housing 10, as will be apparent hereinafter.

To assemble the pinion shaft supporting apparatus for the rack-pinion power transmitting system according to the present invention, when the pinion shaft 14 is inserted into the housing 10, first of all, inner races 24 of the ball bearings 20 are fixedly attached to the outer surface of the shaft portion at side of the pinion 16 of the pinion shaft 14. Thereafter, the pinion shaft 14 is inserted into the housing 10 and then the outer races 22 of the ball bearings 20 are pressed against a shoulder 26 formed on the inner surface of the housing 10 by strongly tightening a nut 28 screwed into an entry opening of the housing 10. It will be seen that in the form shown, the nut 28 presses against the outer races 22 but not the inner races 24. As a result, the two ball bearings 20 are positioned in place and at the same time are properly pre-loaded automatically during the assembling.

Accordingly, the axial rigidity of the pinion shaft 14 supported by the bearings 20 will be adequately strong.

Figure 2:
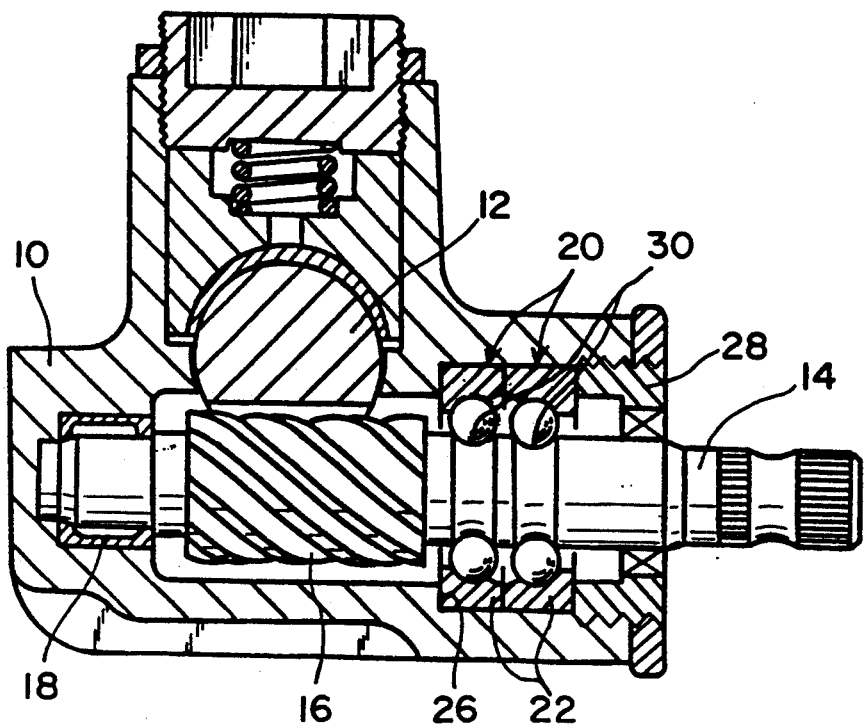
FIG. 2 is a sectional view of a rack-pinion power transmitting system incorporating a pinion shaft supporting apparatus according to a second embodiment of the present invention.

Next, a second embodiment of the present invention shown in FIG. 2 will be explained.

While the inner races 24 of the ball bearings 20 were fixedly attached to the outer surface of the shaft portion at side of the pinion 16 of the pinion shaft 14 in the first embodiment, in this second embodiment, two annular grooves 30 acting as inner races of the bearings 20 are formed in the outer surface of the intermediate portion of the pinion shaft 14, thus eliminating the requirement of the inner races 24 (FIG. 1) for the bearings 20. Other construction in the second embodiment is the same as that of the first embodiment.

Incidentally, in these embodiments, the second bearing means 18 disposed between the outer surface of the free end of the pinion shaft 14 and the inner surface of the housing 10 may comprise a sliding bearing, instead of the roller bearing.

According to the pinion shaft supporting apparatus of the invention, the function for rotatably supporting the pinion shaft 14 is the same as those of the aforementioned conventional examples.

However, in the present invention, since the shaft portion 15 is supported by the two pre-loaded angular ball bearings 20, high rigidity can be realized. Moreover, the assembling of the apparatus is facilitated because the arrangement of the bearings 20 and nut 28 is such that the bearings are readily provided with the desired pre-load by tightening the nut 28 against the outer races 22.

What is claimed is:

1. A rack-pinion mechanism for a vehicle, comprising:
    a housing,
    a pinion shaft having housed within said housing a pinion and first and second supporting portions respectively disposed to opposite sides of said pinion, and
    a rack shaft having a rack meshed with said pinion within said housing, said rack shaft being shiftable in an axial direction thereof by rotation of said pinion to axially shift a tie rod connected to said rack shaft,
    wherein said second supporting portion is supported within said housing by a corresponding bearing means, and
    wherein said first supporting portion of said pinion shaft is supported within said housing by a pair of angular rolling bearings having respective inner races fixed to said first supporting portion and respective outer races abutted with one another, said outer races being held with a predetermined pre-load between a stepped portion of said housing in abutment with one of said outer races and a nut threaded to said housing and pressing against the other of said outer races but not pressing against either of said inner races.

2. A rack-pinion steering mechanism according to claim 1, wherein said angular rolling bearings are angular ball bearings.

3. A rack-pinion steering mechanism according to claim 2, wherein said inner races are constituted by grooves formed in said first supporting portion of said pinion shaft.

4. A rack-pinion steering mechanism according to claim 1, wherein said pinion shaft is received through an entry opening of said housing with said first supporting portion being disposed nearer than said second supporting portion to said entry opening.

* * * * *